United States Patent [19]
Newton

[11] 3,941,911
[45] Mar. 2, 1976

[54] THERMALLY RESISTANT MAGNETIC TAPE

[75] Inventor: Gerald S. Newton, Graham, Tex.

[73] Assignee: Graham Magnetics Incorporated, Graham, Tex.

[22] Filed: Nov. 19, 1973

[21] Appl. No.: 416,884

[52] U.S. Cl. ............... 428/525; 428/538; 428/539; 428/900
[51] Int. Cl.² ........................................ H01F 10/02
[58] Field of Search ........................... 117/235–240; 252/62.54; 428/525, 538, 539, 900

[56] References Cited
UNITED STATES PATENTS

| | | | |
|---|---|---|---|
| 2,871,218 | 1/1959 | Schollenberger | 260/858 |
| 2,899,411 | 8/1959 | Schollenberger | 260/616 X |
| 3,293,066 | 12/1966 | Haines | 117/226 X |
| 3,320,090 | 5/1967 | Graubart | 117/121 X |
| 3,384,679 | 5/1968 | Stetz | 260/835 X |
| 3,484,286 | 12/1969 | Beck et al. | 117/237 X |
| 3,617,378 | 11/1971 | Beck | 117/226 |
| 3,649,541 | 3/1972 | Ingersoll | 260/858 X |

*Primary Examiner*—Bernard D. Pianalto
*Attorney, Agent, or Firm*—Robert A. Cesari; Andrew F. Kehoe; John F. McKenna

[57] ABSTRACT

An improved magnetic tape having the property of retaining magnetic data even when spooled and subjected to high temperature environments. This thermal resistance is suitably achieved by providing a backing coating which contacts the magnetic-particle-bearing facing coating of the tape and is chemically incompatible therewith. Pairs of chemically-incompatible coatings include polyester polyurethane-polyether-polyurethane; polyfluorinated hydrocarbons-polyurethane. A conductive furnace carbon black is advantageously used in the backing coating, and the substrate is, suitably, temperature-resistant polyimide.

23 Claims, 2 Drawing Figures

THERMALLY RESISTANT MAGNETIC TAPE

BACKGROUND OF THE INVENTION

There has been a need for a high-temperature resistant magnetic tape material for use in such applications as aircraft flight-recorder systems and other applications wherein very high temperature resistance is required. Heretofor, such systems have been made from metal rather than polymeric-based tapes. The metal tapes, besides being expensive to manufacture, have not been entirely satisfactory from an operational point of view, either.

There have been intensive and extensive efforts to develop a spooled magnetic tape which will remain magnetically readable at temperatures of 400° F. to 800° F. These efforts have been failures. For example, the tape disclosed by Beck et al. in U.S. Pat. No. 3,484,286 utilizes a substrate that is resistant to thermal degradation and a magnetic coating thereover comprising a matrix copolymer of vinylidene fluoride and hexafluoropropylene and a magnesia stabilizer. Beck et al. disclose nothing very relevant to solving the substantial problems encountered in use of spooled tape at high temperatures which problems have to do with inter-adhesion of adjacent layers and loss of adhesion to substrate, etc. Beck et al. do disclose what has proved to be a very useful substrate material for such applications, i.e. the polyimide substrate sold under the trade designation Kapton by E. I. DuPont de Nemours and Company. However, when used in spooled tape, this material has always presented an extraordinary sticking or clinging tendency creating a far greater problem than any associated with the more commonly-used polyethylene terephthalate films. Another useful polymer substrate having similar properties is a poly(para-phenyleneterephthalamide) sold under the trade designation Kelvar by DuPont. For the purpose of this application, such polymers will be characterized as "refractory polymers," i.e. polymers that retain their structural properties above 450° F.

In art heretofore unrelated to the Beck et al. patent, certain prepolymerized polyurethane resins have been found to be useful in magnetic tape formulations. For example. U.S. Pat. No. 3,649,541 to Ingersoll describes some such prepolymerized polyurethane resins. Some of these are further described in U.S. Pat. No. 2,899,411 to Schollenberger, U.S. Pat. No. 2,871,218 to Schollenberger, U.S. Pat. No. 3,384,679 to Stetz and U.S. Pat. No. 3,320,090 to Graubart also discuss such prepolymerized polyurethane systems which, for a number of reasons, seem to be more desirable for use in magnetic coatings than reactive systems formed.

In further art, heretofore, unrelated, it has been known to use conductive carbon black on the backing tape — usually for antistatic purposes on high-speed tapes. U.S. Pat. No. 3,293,066 to Haines discloses use of an acetylene black in a resin binder for such a purpose.

No combination of the above art has suggested a means for solving the problem of substituting a heat-resistant magnetic tape for the metallic tapes now used in applications wherein very high temperatures are encountered.

SUMMARY OF THE INVENTION

Therefore, it is an object of the present invention to provide a useful magnetic recording tape from which information can be readily retrieved even after the tape has been subjected to temperatures as high as 800° F.

Another object of the invention is to provide a magnetic tape system that does not require a metal substrate and will resist delamination on being unwound after exposure to temperatures above 400° F.

A further object of the invention is to provide a polyurethane based magnetic tape with improved resistance to delamination on being unreeled.

Another object of the invention is to provide improved aircraft flight recorders and like packaged-tape systems.

Still another object of the invention is to provide an improved process for making reeled magnetic tape.

Other objects of the invention will be obvious to those skilled in the art on reading the instant application.

The above objects have been substantially achieved by the discovery that certain chemically incompatible coating systems can be used on the facing (magnetic-particle bearing surface) of a tape substrate and the backing of the same substrate to wholly avoid merger of the coatings at temperatures even as high as 700° to 800° F. These relatively incompatible coatings are advantageously placed on a highly-thermal resistant synthetic resin substrate; indeed, the possibility of using such as synthetic organic resin substrate is one advantage of the invention. However, there is no reason why the invention would not be entirely operable on any flexible thermally-resistant substrate properly primed to adhesively bond to the coatings. An entirely suitable substrate is that formed of polyimide resin and sold under the trade designation Kapton.

An advantageous polymer system combination for use in the invention comprises 1. one polyurethane binder system comprising a polyester-polyurethane system such as is sold under the trade designation Estane 5707 by B. F. Goodrich Company and crosslinked, as with a triisocyanate. This polymer is believed to be of the general type described in U.S. Pat. No. 2,871,218 to Schollenberger.

2. one polyurethane binder system, a polyetherpolyurethane as is sold under the trade designation Estane 5714. This polymer is believed to be of the general type described in U.S. Pat. No. 2,899,411 to Schollenberger.

One of these systems, preferably the first, because of its ability to be more highly loaded will be loaded with a mangetic pigment system, according to procedures known to the art. The magnetic pigment system may not have a low Curie Point. Thus, iron oxide is useful whereas chromium dioxide powders which lose their ability to retain recorded information about 250° F. are not at all useful in such a system.

Because of an extraordinary tendency of the advantageous polyimide substrate to cling to the facing layer of a wound tape, it has been found desirable to load the other of the aforesaid systems with about 30 – 60 weight percent of a carbon black. The carbon black is preferably of the conductive type in order to achieve a desirable anti-static effect. However, the black is also utilized to enhance the resistance to layer-to-layer adhesion at high temperatures.

It is advantageous that the conductive carbon black be of the conductive furnace (CF) type, especially of the ECF type. Acetylene blacks may be used, but they have a relatively small surface area, usually less than 125 square meters per gram, and the higher surface area associated with furnace blacks appears to be responsible for an improved incompatibility (or resistance to intersticking) of the coatings at higher temperature.

While the above invention has been described with particular emphasis on chemically-incompatible polyurethane systems, it should be obvious to those skilled in the art in view of this disclosure that incompatible resin systems adhered to opposite faces of a thermally-resistant substrate, having thermal resistance themselves, and so formulated as to avoid sticking together on heating at high temperatures form operable systems under the broad concept of this invention.

Nevertheless, even in hindsight, it is particularly surprising that applicants' tape has been able to pass tests wherein maximum temperatures of over 700° F., indeed up to 800° F., have been withstood within an aircraft flight-recorder which has been placed for 30 minutes in a pool of burning jet-aircraft fuel. This testing is carried out in a conventional aircraft flight recorder and, according to the procedure for such testing promulgated by the Federal Aviation Administration and published in the Federal Register of Jan. 6, 1966. The recorder is exposed to flames of 1100° C enveloping at least 50 percent of the recorder container. The 30 minutes is the time set for a "Type 1" record medium.

Among alternate synthetic polymers having the requisite heat-resistance and pigment-coating capacity to serve as a matrix for one of the tape coating systems are those formed of fluorinated hydrocarbons, i.e. FEP-type resins including polychlorotrifluoroethylene, FEP fluoroplastic, polyvinylidene fluoride and copolymers formed of such fluoride-bearing monomers. Other synthetic resin systems which can be utilized include polyphenoxy-bearing polymeric compositions of such materials. A poly (para-phenyleneterephthalamide) polymer sold by E. I DuPont under the trade designation Kelvar is also an excellent material for high temperature magnetic tape binders. In general, those skilled in the art will, on reading this disclosure and understanding the thermal requirements of the polymer systems, be able to select appropriate pairs of chemically incompatible matrices for use in the invention. In any case, the use of an ECF carbon black, in quantities of about 40% or more by weight of carbon black in the backing layer and appropriate crosslinking agents is strongly recommended. And the smallest compromise in pigment loading characteristics is achievable with the highly preferred combination of polyester and polyether-type polyurethanes.

IN THE DRAWINGS

FIGS. 1 and 2 are graph comparing the thermal performance of spools of the instant tape with a typical conventional magnetic tape.

The data in the drawings was obtained by spooling 1,000 feet of the tape to be tested into an air oven at the indicated temperature, then withdrawing it cooling it to about 75° F. and running the indicated tests.

Figure 1:
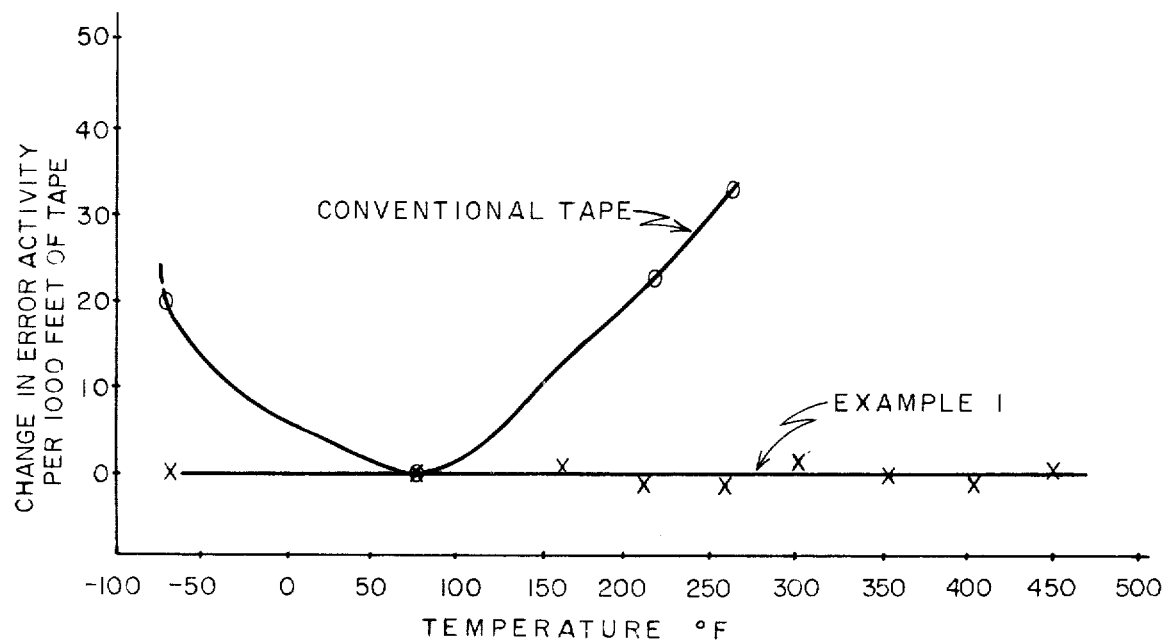
FIG. 1 is indicative of a test on a Control Data Corporation Model 686 certifier (9 track, 3,200 fci, 35% threshold). The test is most useful in evaluating for Digital Tape performance.
Figure 2:
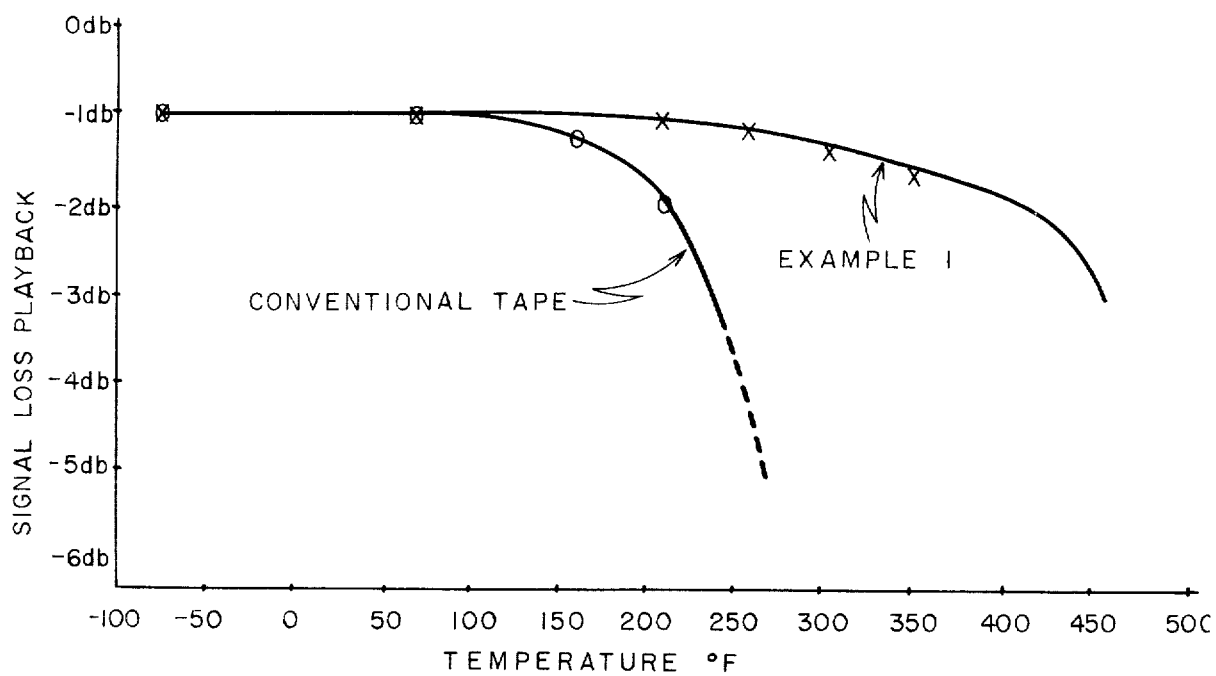
FIG. 2 is indicative of the signal loss on playback when a 1 megahertz signal was recorded on the thermally-conditioned tape at 120 inch per second. The test is most useful in evaluating instrumentation tape.

In general, it will be noted that the tape of Example 1 had
a. a signal loss of less than 2 decibels at 400° F. and
b. a no noticeable increase in error activity at temperatures above 400° F.

In order to point out more fully the nature of the present invention, the following specific examples are given as illustrative embodiments of the present process and products produced thereby.

EXAMPLE 1

A coating with the composition shown in Table 2 is made by dissolving 15 parts by weight of a polyether urethane (sold under the trademark Estane 5714 by B. F. Goodrich Company) in 85 parts by weight of tetrahydrofuran and adding to this solution 0.67 parts the soya lecithin dispersing agent. To this solution was added 15 parts by weight of an ECF carbon black, sold by Cabot Corporation under the trade designation Vulcan XC-72P. The black was dispersed by milling the resulting mixture in a ball mill. The total solids content of the milled mixture was about 25%. Prior to draining from the mill the lubricants (0.33 parts of butoxyethyl steorate) and catalyst (0.016 parts of ferric acetyl acetonate) were added to the mixture with enough additional solvent to reduce the total solids content to 10%. About 0.23 parts of the crosslinking agent, a trissocyanate material formed of a polyurethane type prepolymer with terminal isocyanate functionality and sold under the trade designation Mondur CB-75 by the Mobay Chemical Company, was then added and the final mixture applied to a 0.001 inch thick polyimide film with a gravure coater and dried for 8 seconds at 180° F. to a dry thickness of 0.00008 to 0.0001 inch.

The magnetic coating was prepared by dissolving 72.5 parts by weight of a polyester polyurethane sold B. F. the trade designation Estane 5707 by B.F. Goodrich Company and 2.00 parts by weight of soya lecithin chosen that the total solids content of this solution being 15%. The solution was charged to a ball mill, 72.5 parts by weight of gamma-iron oxide was added and this mixture was milled for 24 hours. This carbon black, (3.7 parts by weight), lubricants (2.3 parts), catalyst (0.05 parts) and sufficient solvent to reduce the total solids content of the mixture to 35% and milling was continued for 2 more hours. This mixture was drained from the mill, 1 part by weight of the isocynanate crosslinking agent is added, and the final mixture applied, by gravure coating, to the opposite side of the previously coated polyimide film and dried as before to a thickness of 0.0002 inch.

The polyimide film, now coated on both sides, was subjected to a calendering process between a compliant paper roll and a smooth steel roll, as is well known in the art, to smooth and compact the two coatings and then placed in an oven for 2 hours at 100° C. after which time the crosslinking reactions were complete as evidenced by the disappearance of the absorbance band at 2300 cm$^{-1}$ in the infared spectrum of tetrahydrofuran extracts of the coating and by the insolubility of the coating when subjected to a "rub test" with a Q-Tip wet with methyethyl ketone. This completed web was then slit to various widths for testing.

TABLE 1

| MAGNETIC FORMULATION | |
|---|---|
| Ingredient | Parts by Weight |
| Gamma -$Fe_2O_3$ | 72.5 |
| Carbon Black (Vulcan XC 72R) | 3.7 |
| Polyester-polyurethane (Estane 5707) | 18.45 |
| Soya Lecithin | 2.00 |
| Lubricants (Butoxyethyl stearate) | 2.30 |
| Crosslinking Agent CB-75 | 1.00 |
| Catalyst, Ferric Acetyl Acetonate | 0.05 |

TABLE 2

| BACKING FORMULATION | |
|---|---|
| Ingredient | Parts By Weight |
| Carbon Black (Vulcan XC-72P) | 45 |
| Polyether-polyurethane (Estane 5714) | 45 |
| Soya Lecithin | 2.00 |
| Lubricants (Butoxyethyl stearate) | 1.00 |
| Crosslinking Agent (CB-75) | 7.00 |
| Catalyst, Ferric Acetyl Acetonate | 0.05 |

As shown in Table 3 the resulting tape had excellent durability characteristics, as determined in the 2-foot shuttle test and these durability characteristics remained at high level after the tape had been heated in an oven at 400° F. for one hour. Commercially available computer tapes usually exhibit failure after 20,000 to 500,000 passes in this test and if heated to only about 400° F. are subject to such extensive physical and chemical damage that the tape cannot be unwound intact for subsequent testing.

Also shown in Table 3 are test results in an audio tape configuration demonstrating the retention of useful magnetic recording properties after exposure to 400° F. Prerecorded music on tape suffered no degradation in quality after heating for one hour at 400° F.

EXAMPLE 2

Example 1 is repeated using the polyurethane binder system of Table 1 for the carbon black-bearing coat and the polyurethane binder system of Table 2 for the magnetic $Fe_2O_3$-bearing coat.

EXAMPLE 3

Example 1 is repeated substituting a binder system formed of a copolymer of vinlidene fluoride and a hexafluoropropylene as the matrix for the carbon black. Such a binder system is described in Example 2 in U.S. Pat. No. 3,484,286 to Beck et al.

EXAMPLE 4

Example 1 is repeated substituting the fluorinated binder system mentioned in example 3 as the matrix for the iron oxide coating.

EXAMPLE 5

Example 4 is repeated, but the fluorinated binder system is used for the backing and the polyether polyurethane of Table 2 is used for the magnetic coating.

EXAMPLE 6

Example 1 is repeated but using a binder system formed of poly (para-phenylene terephthalamide) as the polymeric matrix for the magnetic coating rather than the crosslinked polyester-polyurethane system of Example 1.

EXAMPLE 7

Example 6 is repeated but using the fluorinated copolymer of claim 3 for holding the carbon black and, in this case, using acetylene carbon black in the backing coat.

It will thus be seen that the objects set forth above, among those made apparent from the preceding description, are efficiently attained and, since certain changes may be made in carrying out the above method without departing from the scope of the invention, it is intended that all matter contained in the above description shall be interpreted as illustrative and not in a limiting sense.

What is claimed is:

1. A magnetic tape comprising a substrate formed of a synthetic organic resin, a first magnetic-pigment-containing coating on one side of said substrate and a second non-magnetic-conductive-pigment-containing coating on the other side of said substrate wherein one of said coatings has a polyester polyurethane resin

TABLE 3

| | Tape of Example 1 | DIGITAL EVALUATION | | | Conventional Tape | |
|---|---|---|---|---|---|---|
| Error Activity | Initial | After 1 Hr. at 400° F. | After 1 Hr. at −65° F. | Initial | After 1 Hr. at 400° F. | After 1 Hr. at −65° F. |
| At 3200 flux changes per inch | | | | | Tape was destroyed | |
| Temporary errors | 5 | 6 | 5 | 1 | | 65 |
| Permanent errors | 1 | 1 | 1 | 0 | | 34 |
| At 800 bits per inch | | | | | Could not be unwound for testing. | |
| Temporary Errors | 0 | 4 | 4 | 0 | | 55 |
| Permanent Errors | 0 | 1 | 1 | 0 | | 23 |
| Digital Signal Amplitude At 3200 flux changes per inch, % of NBS Standard Tape | 139 | 130 | 130 | 110 | | 108 |
| At 800 bits per inch, % of NBS Standard Tape | 100 | 104 | 102 | 100 | | 100 |
| Two-foot shuttle test, passes until first dropout occurs (800 bits per inch) | 1,040,431 | 1,040,431 | 808,435 | 175,000 | | 173,000 |
| Relative output at 3KHz | +2db | +2db | +2db | 0db | | −1db | matrix and the other of said coatings has a polyether polyurethane resin matrix and wherein said magnetic pigment is readable after exposure to temperatures at or above 400°F; and wherein said tape, when reeled has a heat resistance of at least 400°F.

2. A magnetic tape as defined in claim 1 wherein said resins are crosslinked by a polyfunctional cross-linking agent.

3. A magnetic tape as defined in claim 1 wherein said polyether urethane is used to form the matrix for the non-magnetic pigment.

4. A magnetic tape as defined in claim 1 wherein said substrate is a refractory polymer.

5. A magnetic tape as defined in claim 2 wherein said substrate is a refractory polymer.

6. A magnetic tape as defined in claim 3 wherein said substrate is a refractory polymer.

7. A magnetic tape as defined in claim 2 wherein said polyether urethane is used to form the matrix for the nonmagnetic pigment.

8. A magnetic tape as defined in claim 3 wherein said polyether urethane is used to form the matrix for the nonmagnetic pigment.

9. A magnetic tape as defined in claim 1 wherein said non-magnetic conductive pigment is a carbon black.

10. A magnetic tape as defined in claim 9 wherein said non-magnetic pigment is a conductive furnace carbon black.

11. A magnetic tape as defined in claim 10 wherein said furnace carbon black is of the ECF-type.

12. A magnetic tape as defined in claim 2 wherein said non-magnetic pigment is a conductive furnace carbon black.

13. A magnetic tape as defined in claim 3 wherein said non-magnetic pigment is a conductive furnace carbon black.

14. A magnetic tape as defined in claim 4 wherein said non-magnetic pigment is a conductive furnace carbon black.

15. A magnetic recording member comprised of
a polyimide film supporting member
a magnetic recording surface on one surface of the support film, this layer being made up of 65–80 weight percent synthetic gamma-$Fe_2O_3$ dispersed in a polyester-urethane binder which is crosslinked with a triisocyanate, said binder and crosslinking agent comprising 20–30 weight percent of the layer and the remainder of the layer made up of 3.7% of a conductive oilfurnace black and 2% to 4% dispersing aids and lubricants and A second layer on the other surface of the support film, this layer being made up of 40–50 weight percent of a conductive oil-furnace black dispersed in a polyether-urethane binder which is crosslinked with a triisocyanate, said binder and crosslinking agent comprising 50–60 weight percent of the layer and the remainder of the layer made of 1% to 5% dispersing aids and lubricants Said first and second layers being chemically inert with one another as evidenced by failure to stick to one another when in spooled backing-to-facing contact at 400°F.

16. The article of claim 15 wherein the polyester-urethane binder is used in the second layer and at the same time the polyether-urethane binder is used as the binder in the magnetic layer.

17. A magnetic tape as defined by claim 1 wherein said tape has a heat resistance of about 700 ° F when reeled.

18. A magnetic tape as defined by claim 15 wherein said tape has a heat resistance of about 700 ° F when reeled.

19. A process for making a reeled magnetic tape which is magnetically stable in an environment of temperatures to at least 700°F comprising the steps of
a. coating one side of a substrate with a polyester polyurethane-based resin matrix containing a member selected from the group consisting of a conductive carbon black and iron oxide and,
b. coating the other side of said substrate with a resin-based matrix which is chemically incompatible with said polyurethane resin containing the other of said group consisting of conductive carbon black and iron oxide,
c. curing said matrices until they are chemically incompatible with one another as evidenced by failure to stick to one another when in spooled backing-to-facing contact at 400°F, and
d. winding said coated substrate on a reel with said matrices in backing-to-face contact.

20. A process as defined in claim 19 wherein said substrate is formed of a synthetic organic resin.

21. A process as defined in claim 20 wherein said resin is a polyimide and said carbon black is a conductive furnace black.

22. A process for improving the resistance to delamination of a magnetic tape formed of a polyimide substrate and a polyurethane facing thereover, comprising the steps of
1. applying a polyester polyurethane coating on one side of the tape and applying a polyether polyurethane coating on the other side of the tape,
2. filling one of the aforesaid coatings with a conductive carbon black,
3. the other said coating comprising a magnetic pigment readable after exposure to temperatures all or above 400°F., and
4. curing said coatings until they are chemically incompatible with one another as evidenced by failure to stick to one another when in spooled backing-to-facing contact at 400°F.

23. A Magnetic tape comprising a polymeric substrate, a first magnetic-pigment-containing coating on one side of said substrate and a second non-magnetic conductive-pigment-containing coating on the other side thereof wherein
1. each of said coatings is based on a different synthetic polymer-based matrix for the pigment contained therein, and said different synthetic polymers are chemically incompatible with each other as evidenced by their failure to adhere to one another when in spooled backing-to-facing contact at 400°F, and
2. the non-magnetic conductive pigment is a furnace carbon black, and wherein one of said coatings is based on a crosslinked polyester polyurethane matrix and one of said coatings is based on a crosslinked polyether matrix and wherein said magnetic pigment is readable after exposure to temperatures at or above 400°F.

* * * * *